Oct. 22, 1963     H. D. HULTERSTRUM     3,107,947

NYLON WHEEL AND AXLE ASSEMBLY

Filed Nov. 15, 1961

INVENTOR
HAROLD D. HULTERSTRUM

BY

*Young and Wright*

ATTORNEYS

United States Patent Office 3,107,947
Patented Oct. 22, 1963

3,107,947
NYLON WHEEL AND AXLE ASSEMBLY
Harold D. Hulterstrum, Baraboo, Wis., assignor to Flambeau Plastics Corporation, Baraboo, Wis., a corporation
Filed Nov. 15, 1961, Ser. No. 152,475
1 Claim. (Cl. 308—8)

This invention appertains to an axle and wheel or roller assembly of the type employed with an overhead track for suspending sliding or folding doors, partitions and the like; the assembly being capable of other uses, such as with sliding drawers.

One of the primary objects of my invention is to provide an axle and wheel or roller assembly in which the wheel or roller and axle are formed from like material, preferably nylon, to form a noiseless, anti-friction bearing surface, the construction being such that the rollers or wheels can be quickly and easily associated with the axles and without the use of special tools and when the wheels and axles are associated, accidental displacement of these parts will be prevented.

Another salient object of my invention is to provide a wheel and axle assembly formed from nylon or similar thermoplastic material and embodying a body including a central block and outwardly projecting axles or studs terminating in heads disposed in spaced relation to the ends of the block, the body being taken in its cold (contracted) state and the wheels being taken in their hot (expanded) condition directly from the mold press, so that the wheels can be easily placed over the heads for assembly; the wheels when cold contracting around the axles and hence confined between the heads and block terminals.

A further important object of my invention is to provide an axle and a wheel formed from a material having the same coefficient of expansion, so that when the wheel is in a hot condition and the axle is in a cold condition, the wheel and axle can be quickly assembled.

A still further object of my invention is to provide an assembly of the above character in which an adjustable bolt can be readily suspended from the block and between the wheels for connection with desired parts of a sliding door or the like.

With these and other objects in view, the invention consists in the novel construction, arrangement and formation of parts, as will be hereinafter more specifically described and claimed and illustrated in the accompanying drawings, in which drawings, FIGURE 1 is a central longitudinal sectional view through my improved axle and wheel assembly showing the parts in their cold contracted condition, the section being taken on the line 1—1 of FIGURE 2, looking in the direction of the arrows;

Referring to the drawing in detail, wherein similar reference characters designate corresponding parts throughout the several views, the letter A generally indicates my novel wheel and axle assembly.

Figure 1:
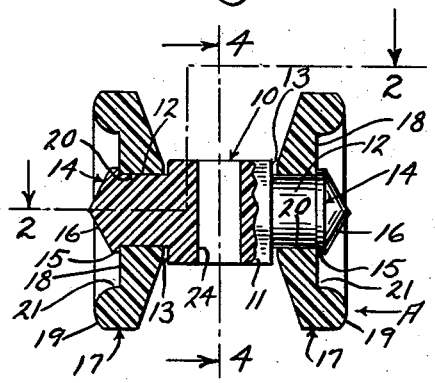

The assembly A includes a body 10 having a centrally disposed block portion 11. Formed on the ends of the block are outwardly projecting stub axles 12. These axles 12 are of a diameter less than the width and height of the block 11, so that shoulders 13 will be formed at the ends of the block. The axles 12 terminate in heads 14 and these heads actually define an annular flange 15. The heads taper outwardly toward a central point from the flange 15, as indicated by the reference character 16. Thus at the ends of each axle is a stop shoulder 13 and a stop flange 15. The body 10 is formed from a thermoplastic material and preferably of nylon.

Each axle 12 has associated therewith a wheel or roller 17. The wheels 17 are also formed from a thermoplastic material, preferably nylon, and great stress is laid on the fact that the wheels 17 and the body 10 are formed from the same material, namely, a material having the same coefficient of expansion. While the wheels 17 can take different forms, the same preferably each include a hub disc 18 and an outwardly projecting rim 19. Each hub disc 18 is provided with an axial bore 20 and the bores of the hub discs have an interior diameter the same as, or slightly greater than the diameter of the axles 12. Thus the bores 20 normally have a diameter less than the diameter of the stop flanges 15. The inner faces of the hub discs 18 are preferably of a convex shape and thus these hub discs taper uniformly outwardly from their bores to the treads of the rims 19. In view of the fact that the rims 19 project outwardly from the outer faces of the wheels, the wheels on their outer faces are provided with interior chambers 21.

Figure 5:
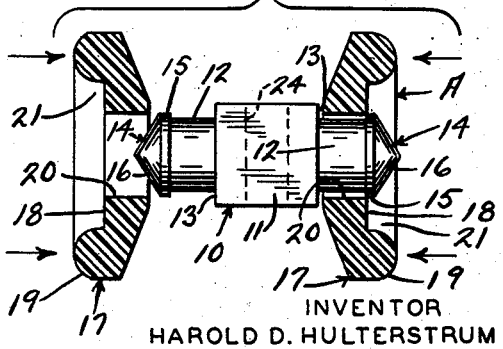
FIGURE 5 is a composite view partly in section showing the wheels being assembled on the axles, the wheels being in a hot expanded condition and the axles being in a cold contracted condition.

As brought out in the objects of the specification, one of the important features of the invention is the forming of the body 10 and the wheels from like material, namely, nylon, and the novel method employed in assembling the wheels on the axles 12 of the body. This method is as follows:

The bodies 10 are molded and are allowed to reach a cold condition. The wheels are taken from the mold press in their hot expanded condition, and at this time the bores 20 of the wheels have a diameter substantially equal to the diameter of the flanges 15, as best shown in FIGURE 5. The wheels 17 are now slid over the flanges 15 so that the hub discs 18 will be disposed between the shoulders 13 of the block 11 and the inner faces of the flanges 15. Upon the cooling and shrinking of the wheels 17 the same will contract about the axles and thus these wheels will be confined between the shoulders 13 and the flanges 15. In case a wheel should be imperfect, the same can be readily removed from its axle either by forcibly springing the wheel over the flanges 15 or by re-heating the wheel and sliding the same over the flange.

Figure 2:
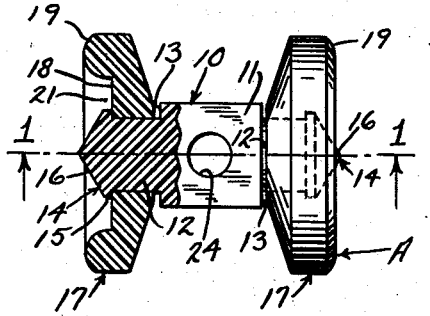
FIGURE 2 is a top plan view of the assembly with parts broken away and in section, the part in section being taken on the line 2—2 of FIGURE 1, looking in the direction of the arrows.
Figure 3:
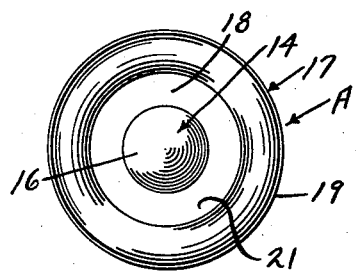
FIGURE 3 is an end elevational view of the assembly.
Figure 4:
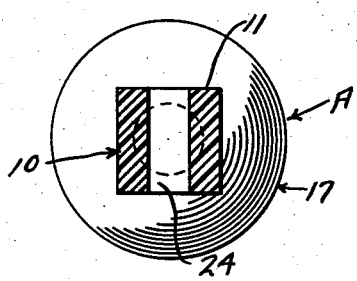
FIGURE 4 is a transverse sectional view through the assembly taken on the line 4—4 of FIGURE 1, looking in the direction of the arrows, showing the formation of the central block for receiving an adjustable bolt.
Figure 6:
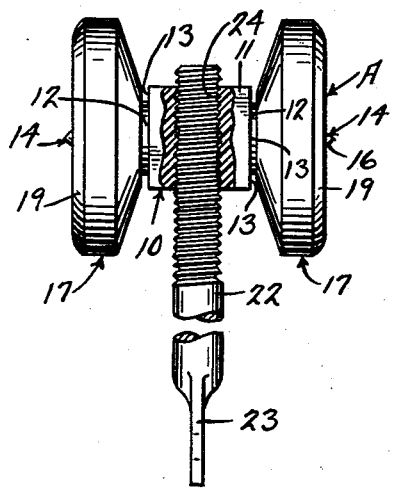
FIGURE 6 is a side elevational view of a complete assembly showing the adjustable bolt connected therewith, parts of the view being shown broken away and in section.

By referring to FIGURES 1 and 2, it can be seen that the heads 14 lie substantially within the chambers 21 of the wheels 17.

The assembly, when completed, is particularly useful with an overhead track having V-shaped runways, so that the edges of the treads of the wheels will ride on the track in lieu of the disc peripheries of the treads. This is important, in that the parting line for the molds usually takes place at the center line of the treads. The assembly is ideal for supporting sliding doors or the slats thereof and the doors can be suspended from the blocks or bodies 10 in different ways; however, I prefer to utilize a threaded bolt 22, having a spade shaped head 23 for the connection with the door. The block 11 at its center is provided with a bore 24 and the bolt is threaded into this bore. Obviously, the bolt can be adjusted up and down relative to the block, which is of great importance.

Various changes in details may be made without departing from the spirit or the scope of this invention, but what I claim as new is:

A wheel and axle assembly comprising a one-piece molded plastic body including a central block and outwardly projecting stub axles, confining heads on the terminals of the stub axles arranged in spaced relation to the ends of the block, and wheels having axial bores of a normal interior diameter substantially equal to the exterior diameter of the stub axles, said wheels being sprung over the heads with the heads in a contracted condition and the wheels in an expanded condition with the diameter of the bores of the wheels substantially equal to the exterior diameter of the heads and onto said axles and confined between the heads and the ends of the block when the wheels are in a contracted condition, the body and wheels being formed from like material having the same coefficient of expansion.

References Cited in the file of this patent

UNITED STATES PATENTS

| | | |
|---|---|---|
| 2,129,257 | Bachmann | Sept. 6, 1938 |
| 2,724,867 | Smith | Nov. 29, 1955 |
| 2,757,054 | Van De Warker | July 31, 1956 |
| 2,924,431 | Chadbourne | Feb. 9, 1960 |
| 2,957,197 | Johnson | Oct. 25, 1960 |

FOREIGN PATENTS

| | | |
|---|---|---|
| 421,335 | Great Britain | Dec. 14, 1934 |